United States Patent
Higashi

(10) Patent No.: US 9,591,276 B2
(45) Date of Patent: Mar. 7, 2017

(54) DISPLAY DEVICE, ELECTRONIC APPARATUS, AND METHOD FOR DRIVING DISPLAY DEVICE

(71) Applicant: Japan Display Inc., Tokyo (JP)

(72) Inventor: Amane Higashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 29 days.

(21) Appl. No.: 14/559,449

(22) Filed: Dec. 3, 2014

(65) Prior Publication Data

US 2015/0181188 A1  Jun. 25, 2015

(30) Foreign Application Priority Data

Dec. 25, 2013  (JP) .................................. 2013-267046

(51) Int. Cl.
| | |
|---|---|
| G09G 5/10 | (2006.01) |
| H04N 9/07 | (2006.01) |
| G09G 3/34 | (2006.01) |
| H04N 9/04 | (2006.01) |

(52) U.S. Cl.
CPC ............. *H04N 9/07* (2013.01); *G09G 3/3406* (2013.01); *H04N 9/045* (2013.01); *G09G 2300/0452* (2013.01); *G09G 2320/0646* (2013.01)

(58) Field of Classification Search
CPC ......... G09G 3/3406; G09G 2300/0452; G09G 2320/0646; H04N 9/045
See application file for complete search history.

(56) References Cited

U.S. PATENT DOCUMENTS

| | | | |
|---|---|---|---|
| 2009/0231454 A1* | 9/2009 | Miura | H04N 5/23212 348/220.1 |
| 2009/0315921 A1 | 12/2009 | Sakaigawa et al. | |
| 2011/0181635 A1 | 7/2011 | Kabe et al. | |
| 2013/0076936 A1 | 3/2013 | Yoshida | |
| 2014/0125689 A1* | 5/2014 | Ikeda | G09G 5/02 345/591 |

FOREIGN PATENT DOCUMENTS

| | | |
|---|---|---|
| JP | 09-139952 A | 5/1997 |
| JP | 2010-33009 A | 2/2010 |
| JP | 2011-154323 A | 8/2011 |
| JP | 2013-074395 A | 4/2013 |

* cited by examiner

*Primary Examiner* — Lixi C Simpson
*Assistant Examiner* — Ngan T Pham Lu
(74) *Attorney, Agent, or Firm* — Michael Best & Friedrich LLP

(57) ABSTRACT

According to an aspect, a display device includes a signal processing unit that converts an input value of a input HSV color space of an input signal into an extension value of an extended HSV color space extended with a first color, a second color, a third color, and a fourth color to generate an output signal; performs peaking processing for analyzing the input signal of the imaged image to detect a focusing region; and determines whether to perform display in a peaking mode for highlighting the focusing region. When it is determined to perform display in the peaking mode, the signal processing unit increases a value of the output signal of the fourth color of a pixel in an outer edge of the focusing region.

7 Claims, 14 Drawing Sheets

- NO PEAKING DISPLAY — 82
- WHITE — 84a
- RED — 84b
- YELLOW — 84c
- LIGHT — 84d
- LIGHT WHITE — 84e
- LIGHT RED — 84f
- LIGHT YELLOW — 84g
- LIGHT (INTENSIFIED) — 84h

|  | R | G | B | W |
|---|---|---|---|---|
| WHITE | 255 | 255 | 255 | 0 |
| RED | 255 | 0 | 0 | 0 |
| YELLOW | 255 | 255 | 0 | 0 |
| LIGHT | $\alpha=1+X$ | $\alpha=1+X$ | $\alpha=1+X$ | $\alpha=1+X$ |
| LIGHT WHITE | 255 | 255 | 255 | 255 |
| LIGHT RED | 255 | 0 | 0 | 255 |
| LIGHT YELLOW | 255 | 255 | 0 | 255 |
| LIGHT (INTENSIFIED) | $\alpha=1$ | $\alpha=1$ | $\alpha=1$ | 255 |

- LENS 532
- MAIN BODY PART 531
- 534 DISPLAY UNIT
- 533 START/STOP SWITCH

- 551 UPPER HOUSING
- 554 DISPLAY UNIT
- 552 LOWER HOUSING

DISPLAY DEVICE, ELECTRONIC APPARATUS, AND METHOD FOR DRIVING DISPLAY DEVICE

CROSS-REFERENCE TO RELATED APPLICATIONS

This application claims priority from Japanese Application No. 2013-267046, filed on Dec. 25, 2013, the contents of which are incorporated by reference herein in its entirety.

BACKGROUND

1. Technical Field

The present disclosure relates to a display device, an electronic apparatus, and a method for driving the display device.

2. Description of the Related Art

An electronic apparatus including an imaging device and a display device, such as a compact camera, a single-lens reflex camera, a cellular telephone, and a smartphone, causes the display device to display an image imaged by the imaging device. Even an electronic apparatus including the display device but not including the imaging device may cause the imaged image to be displayed.

The electronic apparatuses have a function for processing an image at an in-focus position (peaking position) to be displayed in displaying the image imaged by the imaging device. For example, Japanese Patent Application Laid-open Publication No. 2013-74395 and Japanese Patent Application Laid-open Publication No. H9-139952 disclose a technique for performing image processing to extract an edge of an image, assuming the edge as an in-focus portion and converting a color of the edge into a predetermined background color of the in-focus region, and adding a predetermined value to a signal value.

When the predetermined background color or the signal value is added to the in-focus region (focusing region), images of the same color may be generated in the image, so that the focusing region cannot be easily distinguished from other regions and the focusing region becomes hard to see in some cases.

A technique has been developed for adding the fourth sub-pixel, for example, a white pixel to red, green, and blue sub-pixels in the related art of the display devices. In this technique, the fourth sub-pixel enhances luminance, so that a current value of a backlight can be reduced to reduce power consumption. As the fourth sub-pixel, a color the luminance of which is higher than that of the red, green, and blue sub-pixels in the same output is used.

For the foregoing reasons, there is a need for a display device, an electronic apparatus, and a method for driving the display device that can display the focusing region to be easily viewable regardless of the imaged image.

SUMMARY

According to an aspect, a display device displays an imaged image. The display device includes an image display panel in which pixels are arranged in a two-dimensional matrix, each of the pixels including a first sub-pixel that displays a first color, a second sub-pixel that displays a second color, a third sub-pixel that displays a third color, and a fourth sub-pixel that displays a fourth color; and a signal processing unit that converts an input value of an input HSV color space of an input signal into an extension value of an extended HSV color space extended with the first color, the second color, the third color, and the fourth color to generate an output signal, and outputs the output signal to the image display panel. The signal processing unit includes an image processing unit that converts the input value of the input HSV color space of the input signal into the extension value of the extended HSV color space extended with the first color, the second color, the third color, and the fourth color, to generate the output signal; an image processing unit that performs peaking processing for analyzing the input signal of the imaged image to detect a focusing region in which a subject exists at a focal position; and a mode determination unit that determines whether to perform display in a peaking mode for highlighting the focusing region. When the mode determination unit determines to perform display in the peaking mode, the signal processing unit increases a value of the output signal of the fourth color of a pixel in an outer edge of the focusing region.

According to another aspect, an electronic apparatus includes the display device and an imaging device that images the imaged image.

According to another aspect, a method for driving display device that displays an imaged image. The display device includes an image display panel in which pixels are arranged in a two-dimensional matrix, each of the pixels including a first sub-pixel that displays a first color, a second sub-pixel that displays a second color, a third sub-pixel that displays a third color, and a fourth sub-pixel that displays a fourth color. The method includes detecting an input value of an input HSV color space of an input signal; determining whether to perform display in a peaking mode for highlighting a focusing region, in which a subject exists at a focal position, in the imaged image; performing peaking processing for analyzing the input signal of the imaged image to detect the focusing region when it is determined to perform display in the peaking mode; and converting the input value into an extension value of an extended HSV color space extended with the first color, the second color, the third color, and the fourth color to generate an output signal, increasing a value of the output signal of the fourth color of a pixel in an outer edge of the focusing region, and outputting the output signal to the image display panel.

DETAILED DESCRIPTION

Figure 1:
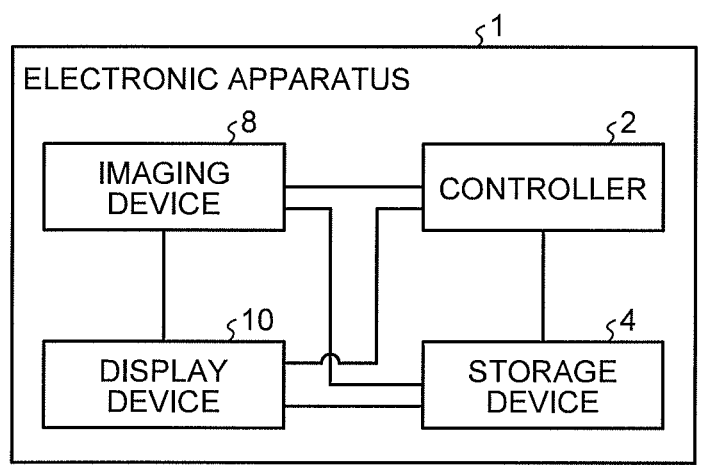
FIG. 1 is a block diagram illustrating a configuration example of an electronic apparatus according to an embodiment.

The following describes an embodiment of the present disclosure with reference to the drawings. The embodiment is merely an example, and the present disclosure naturally encompasses appropriate modifications easily conceivable by those skilled in the art without changing the gist of the disclosure. For clearer explanation, the drawings may schematically illustrate a width, a thickness, a shape, and the like of each component as compared with a real aspect. However, this is merely an example and does not intend to limit an interpretation of the present disclosure. Through the specification and the drawings, each of the same components that have been already described with reference to the other drawings is denoted by the same reference numeral, and a specific description thereof may not be repeated.

Configuration of Electronic Apparatus

FIG. 1 is a block diagram illustrating a configuration example of an electronic apparatus according to an embodiment. An electronic apparatus 1 illustrated in FIG. 1 includes a controller 2, a storage device 4, an imaging device 8, and a display device 10. The controller 2 has an arithmetic function for controlling an operation of each component of the electronic apparatus 1. The storage device 4 stores therein a program required for executing processing of each component of the electronic apparatus 1, data of an image photographed by the imaging device 8, and other data. The imaging device 8 is a device for photographing a photographing region. The imaging device 8 has a function for adjusting a focal distance and adjusting a focal position (focus). The function for adjusting the focal position may be any of a manual focusing function that manually adjusts the focal position and an automatic focusing function that automatically adjusts the focal position. A function of the display device 10 described later can be suitably used in the case of the manual focusing function.

Configuration of Display Device

Figure 2:
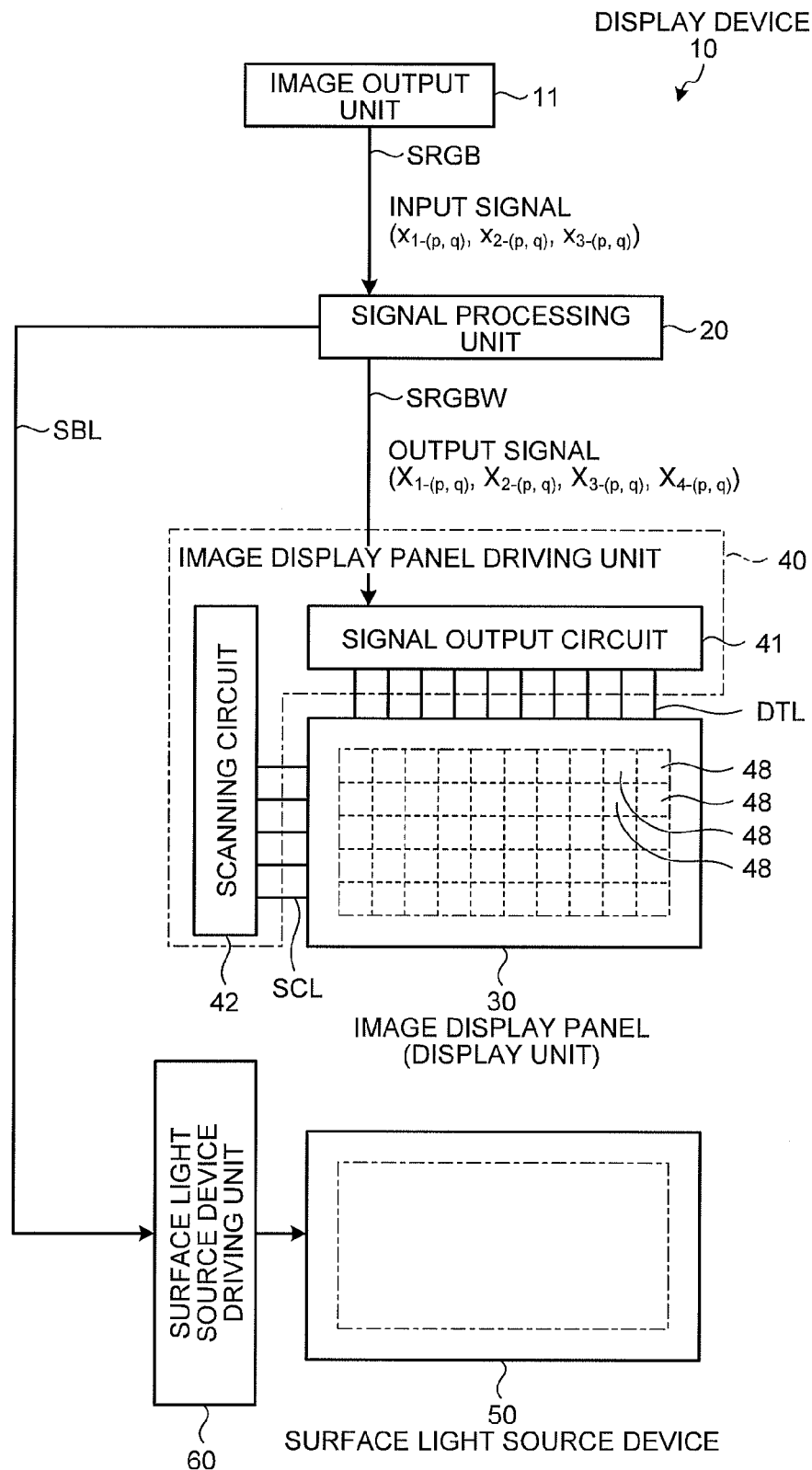
FIG. 2 is a block diagram illustrating a configuration example of a display device of the electronic apparatus illustrated in FIG. 1.
Figure 3:
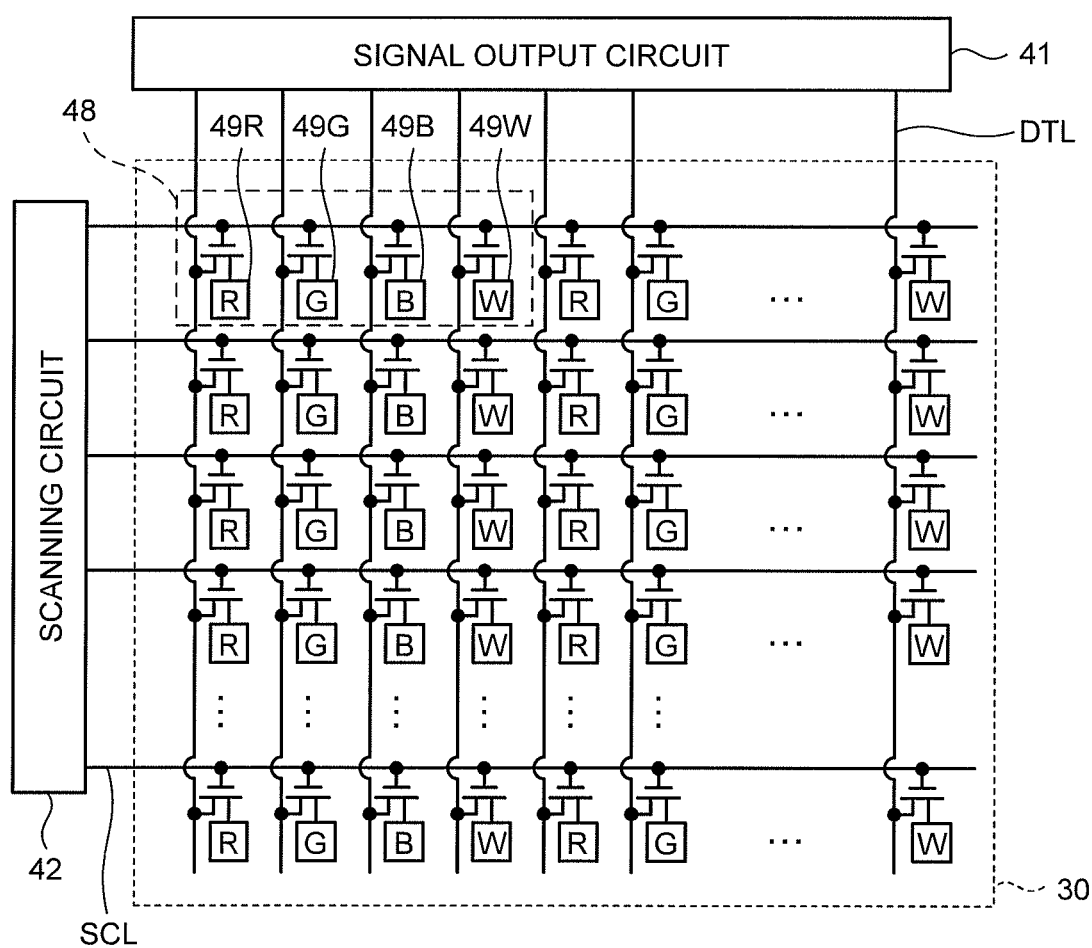
FIG. 3 is a diagram illustrating an example of a pixel array of an image display panel according to the embodiment.

FIG. 2 is a block diagram illustrating a configuration example of the display device of the electronic apparatus illustrated in FIG. 1. FIG. 3 is a diagram illustrating an example of a pixel array of an image display panel according to the embodiment.

As illustrated in FIG. 2, the display device 10 includes a signal processing unit 20 that receives an image input signal SRGB input from an image output unit 11 and transmits an output signal SRGBW to each component of the display device 10 to control an operation of each component, an image display panel (display unit) 30 that displays an image based on the output signal SRGBW output from the signal processing unit 20, an image display panel driving unit 40 that controls driving of the image display panel 30, a surface light source device 50 that illuminates the image display panel 30 from a back surface thereof, and a surface light source device driving unit 60 that controls driving of the surface light source device 50. The configuration of the display device 10 is similar to that of an image display device assembly disclosed in Japanese Patent Application Laid-open Publication No. 2011-154323 (JP-A-2011-154323). Various modifications disclosed in JP-A-2011-154323 can be applied to the display device 10. The image output unit 11 receives image data input from the imaging device 8, the controller 2, or the storage device 4, generates the input signal SRGB from the input image data, and transmits the input signal SRGB to the signal processing unit 20.

The signal processing unit 20 is an arithmetic processing unit that controls operations of the image display panel 30 and the surface light source device 50. The signal processing unit 20 is coupled to the image display panel driving unit 40 for driving the image display panel 30 and the surface light source device driving unit 60 for driving the surface light source device 50. The signal processing unit 20 processes the input signal input from the outside to generate the output signal and a surface light source device control signal. That is, the signal processing unit 20 converts an input value (input signal) of an input HSV color space of the input signal into an extension value (output signal) of an extended HSV color space extended with a first color, a second color, a third color, and a fourth color, and outputs the generated output signal to the image display panel 30. The signal processing unit 20 outputs the generated output signal to the image display panel driving unit 40, and outputs the generated surface light source device control signal SBL to the surface light source device driving unit 60.

As illustrated in FIG. 2, in the image display panel 30, $P_0 \times Q_0$ pixels 48 ($P_0$ in a row direction and $Q_0$ in a column direction) are arranged in a two-dimensional matrix. FIG. 2 illustrates an example in which a plurality of pixels 48 are arranged in a matrix in an XY two-dimensional coordinate system. In this example, the row direction is an X-direction and the column direction is a Y-direction.

The pixel 48 includes a first sub-pixel 49R, a second sub-pixel 49G, a third sub-pixel 49B, and a fourth sub-pixel 49W. The first sub-pixel 49R displays a first primary color (for example, red). The second sub-pixel 49G displays a second primary color (for example, green). The third sub-pixel 49B displays a third primary color (for example, blue). The fourth sub-pixel 49W displays the fourth color (specifically, white). In this way, each of the pixels 48 arranged in a matrix in the image display panel 30 includes the first sub-pixel 49R that displays the first color, the second sub-pixel 49G that displays the second color, the third sub-pixel 49B that displays the third color, and the fourth sub-pixel 49W that displays the fourth color. The first color, the second color, the third color, and the fourth color are not limited to the first primary color, the second primary color, the third primary color, and white. It is sufficient that the colors are different from each other, for example, complementary colors. The fourth sub-pixel 49W that displays the fourth color is preferably brighter than the first sub-pixel 49R that displays the first color, the second sub-pixel 49G that displays the second color, and the third sub-pixel 49B that displays the third color, when being irradiated with the same light source lighting quantity. Hereinafter, the first sub-pixel 49R, the second sub-pixel 49G, the third sub-pixel 49B, and the fourth sub-pixel 49W are collectively referred to as a sub-pixel 49 in a case in which they do not need to be distinguished from each other.

The display device 10 is, more specifically, a transmissive color liquid crystal display device. As illustrated in FIG. 3, the image display panel 30 is a color liquid crystal display panel in which a first color filter for transmitting the first primary color is arranged between the first sub-pixel 49R and an image observer, a second color filter for transmitting the second primary color is arranged between the second sub-pixel 49G and the image observer, and a third color filter for transmitting the third primary color is arranged between the third sub-pixel 49B and the image observer. In the image display panel 30, a color filter is not arranged between the fourth sub-pixel 49W and the image observer. A transparent resin layer may be provided to the fourth sub-pixel 49W instead of the color filter. In this way, by providing the transparent resin layer in the image display panel 30, it is possible to prevent a large level difference from being generated in the fourth sub-pixel 49W when the color filter is not provided to the fourth sub-pixel 49W.

The image display panel driving unit 40 illustrated in FIG. 2 and FIG. 3 is included in the controller 2 according to the embodiment, and includes a signal output circuit 41 and a scanning circuit 42. The image display panel driving unit 40 holds a video signal with the signal output circuit 41 and sequentially outputs the video signal to the image display panel 30. The signal output circuit 41 is electrically coupled to the image display panel 30 via signal lines DTL. The image display panel driving unit 40 selects the sub-pixel 49 in the image display panel 30 with the scanning circuit 42, and controls to turn on/off a switching element (for example, a thin film transistor (TFT)) for controlling an operation (light transmittance) of the sub-pixel. The scanning circuit 42 is electrically coupled to the image display panel 30 via scanning lines SCL.

The surface light source device 50 is arranged on the back surface of the image display panel 30, and illuminates the image display panel 30 by emitting light thereto. The surface light source device driving unit 60 controls an amount and the like of the light output from the surface light source device 50. The surface light source device driving unit 60 is included in the controller 2 according to the embodiment. Specifically, the surface light source device driving unit 60 adjusts a duty ratio or an electric current that is supplied to the surface light source device 50 based on the surface light source device control signal SBL output from the signal processing unit 20 to control the amount of light (light intensity) that irradiates the image display panel 30.

Processing Operation of Display Device

Figure 4:
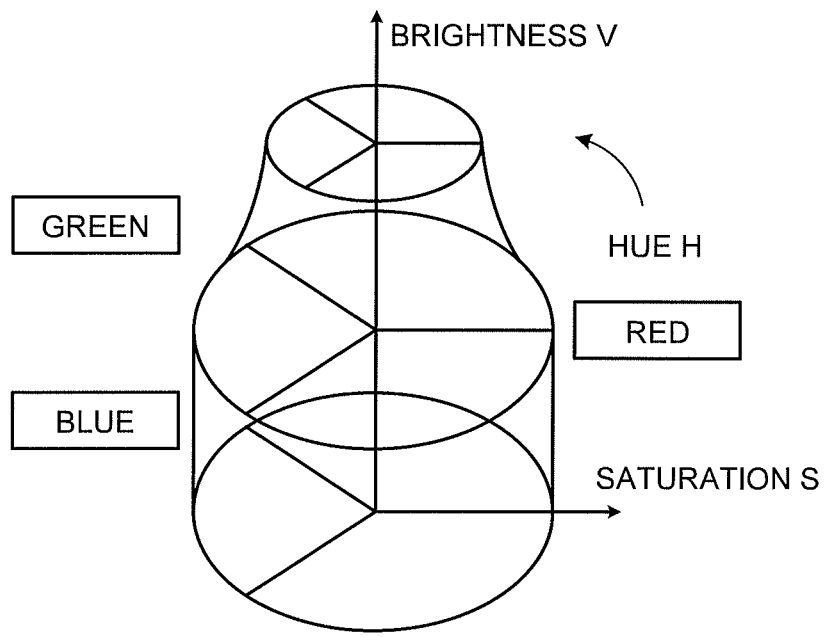
FIG. 4 is a conceptual diagram of an extended HSV color space that is extendable in the display device according to the embodiment.
Figure 5:
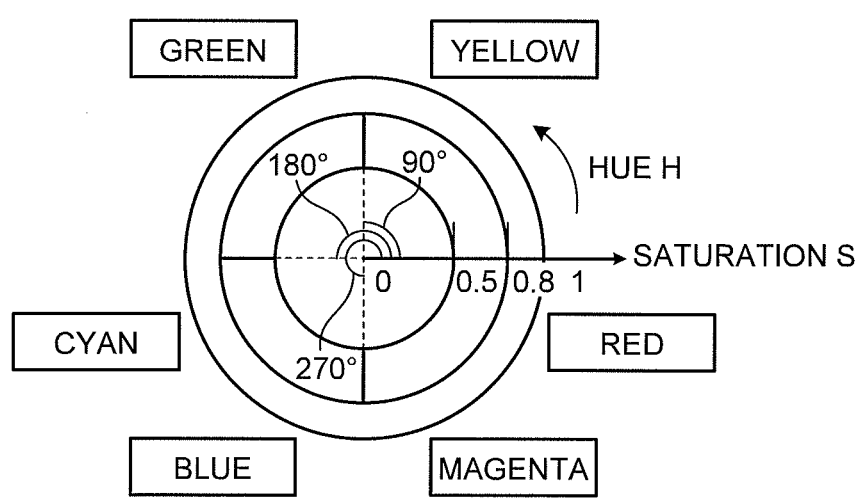
FIG. 5 is a conceptual diagram illustrating a relation between a hue and saturation (also called as chroma) of the extended HSV color space.
Figure 6:
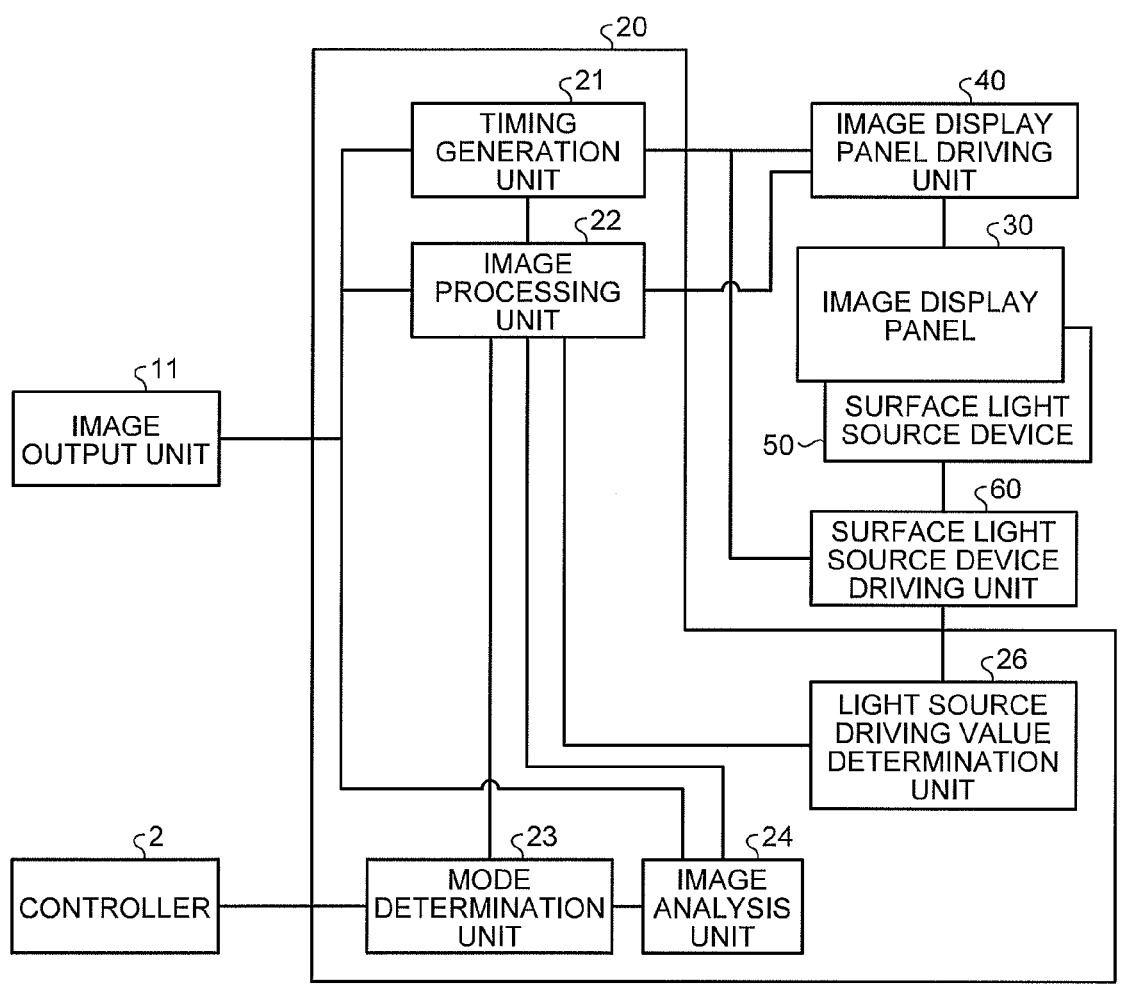
FIG. 6 is a block diagram for explaining a signal processing unit according to the embodiment.

Next, the following describes a processing operation executed by the display device 10, more specifically, the signal processing unit 20. FIG. 4 is a conceptual diagram of the extended HSV color space that is extendable in the display device according to the embodiment. FIG. 5 is a conceptual diagram illustrating a relation between a hue and saturation of the extended HSV color space. FIG. 6 is a block diagram for explaining the signal processing unit according to the embodiment.

As illustrated in FIG. 2, the input signal SRGB serving as information of an image to be displayed is input to the signal processing unit 20 from the image output unit 11. The input signal SRGB includes information of an image (color) to be displayed at the position as the input signal for each pixel. Specifically, in the image display panel 30 in which $P_0 \times Q_0$ pixels 48 are arranged in a matrix, with respect to the (p, q)-th pixel 48 (where $1 \leq p \leq P_0$, $1 \leq q \leq Q_0$), signals including an input signal of the first sub-pixel 49R the signal value of which is $x_{1-(p,q)}$, an input signal of the second sub-pixel 49G the signal value of which is $x_{2-(p,q)}$, and an input signal of the third sub-pixel 49B the signal value of which is $x_{3-(p,q)}$ (refer to FIG. 2) are input to the signal processing unit 20. As illustrated in FIG. 6, the signal processing unit 20 includes a timing generation unit 21, an image processing unit 22, a mode determination unit 23, an image analysis unit 24, and a light source driving value determination unit 26.

The timing generation unit 21 generates a reference clock or the like that is a signal for synchronizing an operation of the image display panel 30 with an operation of the surface light source device 50. The image processing unit 22 performs various types of processing on the input signal input from the image output unit 11 to generate a signal (display signal) to be output to the image display panel driving unit 40. Examples of the processing performed by the image processing unit 22 include, but are not limited to, γ correction, color space correction, processing for converting an RGB signal into an RGBW signal. The image processing unit 22 also performs peaking processing for highlighting and displaying a focusing region serving as an in-focus region.

The mode determination unit 23 determines whether to perform the peaking processing with the image processing unit 22, and determines a mode of the peaking processing to be performed. The mode determination unit 23 determines the mode based on a setting set by a user.

The image analysis unit 24 analyzes an image output from the image output unit 11 and detects the in-focus region (focusing region) of the image. Specifically, the image analysis unit 24 detects an edge through image processing, and determines a region where the edge is detected as the focusing region. Various methods can be used as a method for detecting the edge. Examples thereof include, but are not limited to, a method for detecting a position where the image is discontinuous based on a difference with respect to an adjacent pixel. The image analysis unit 24 transmits acquired information of the focusing region to the image processing unit 22.

The light source driving value determination unit 26 determines an amount of light (light-emitting diode (LED) lighting quantity) output from a light source of the surface light source device 50 based on results from the image processing unit 22 and the image analysis unit 24, and outputs the determined amount of light (LED lighting quantity) to the surface light source device driving unit 60.

Figure 7:
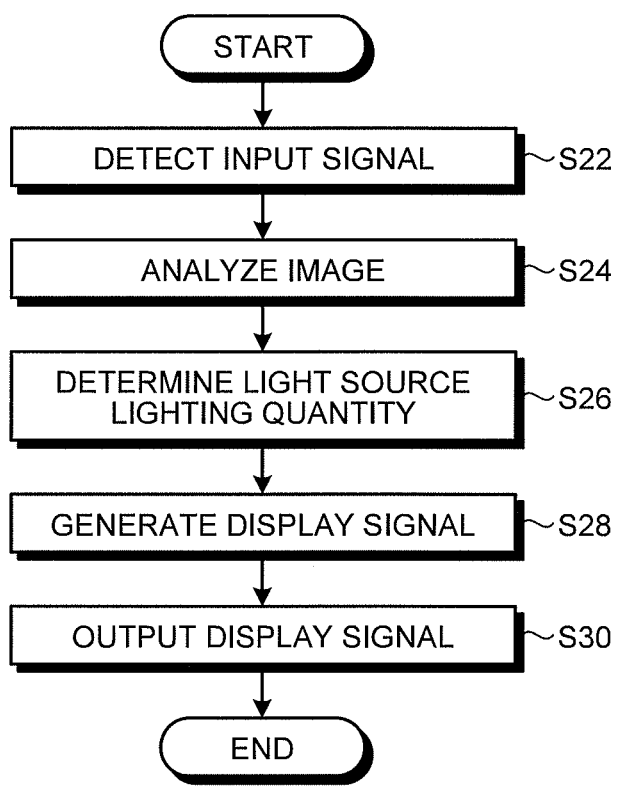
FIG. 7 is a flowchart of a method for driving the display device according to the embodiment.
Figure 8:
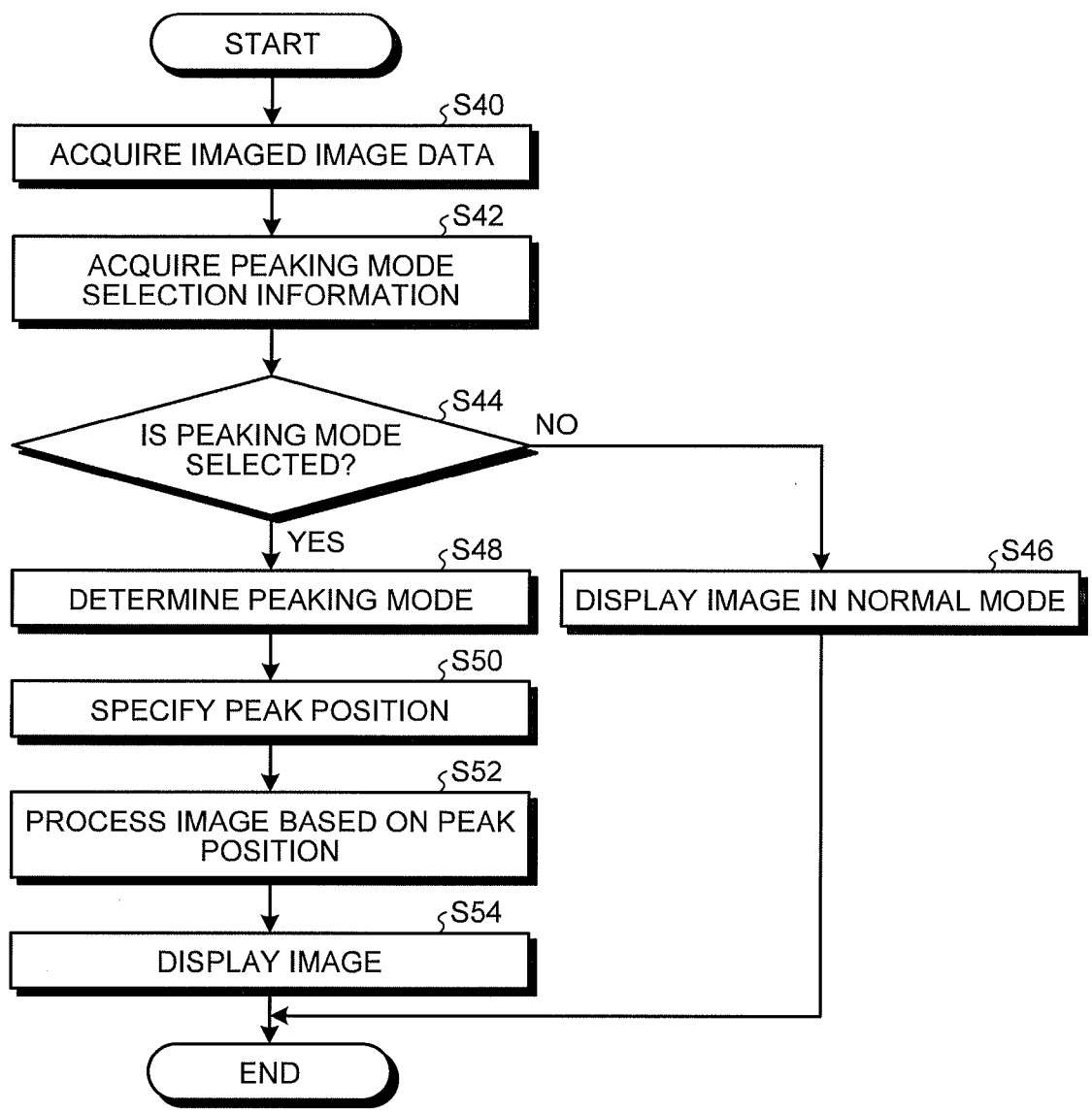
FIG. 8 is a flowchart of the method for driving the display device according to the embodiment.
Figures 9, 10:
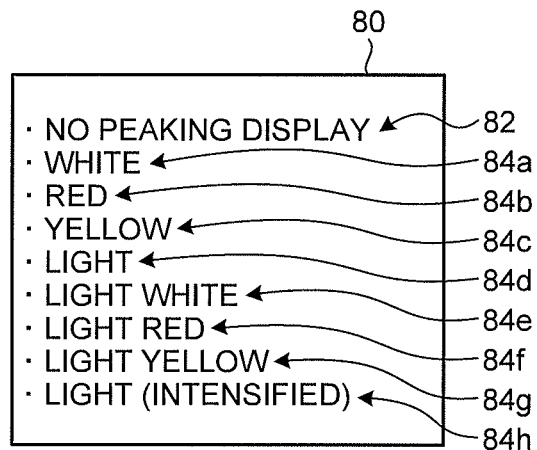
FIG. 9 is an explanatory diagram for explaining the method for driving the display device.
FIG. 10 is an explanatory diagram illustrating a relation between a peaking mode and signal conversion.
Figure 11:
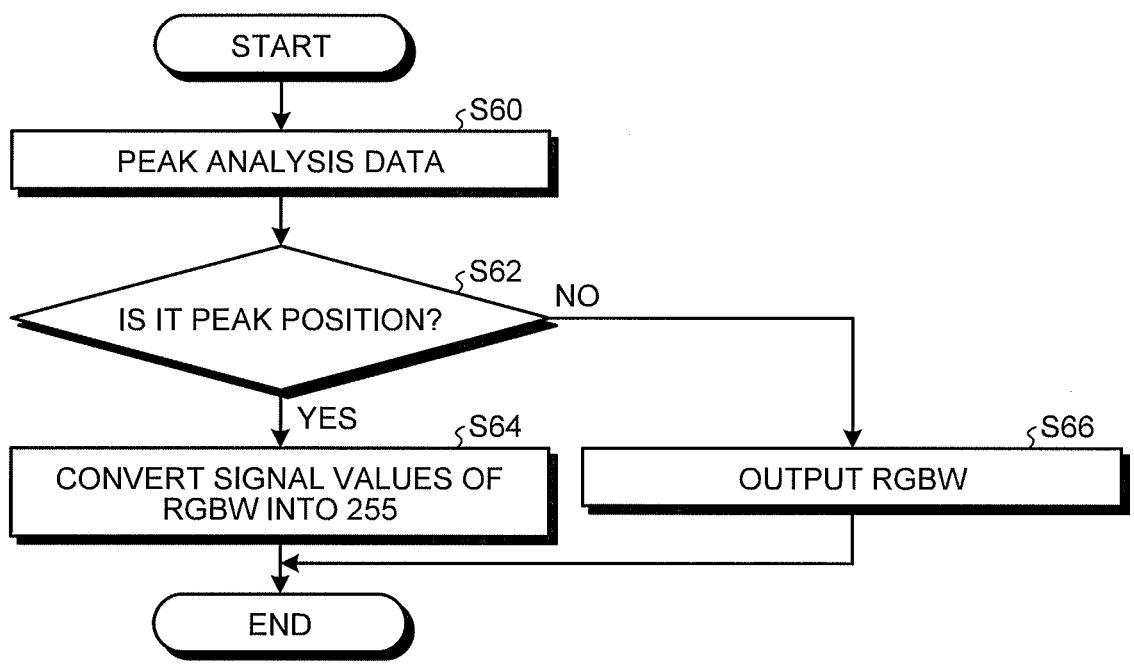
FIG. 11 is a flowchart of the method for driving the display device according to the embodiment.
Figure 12:
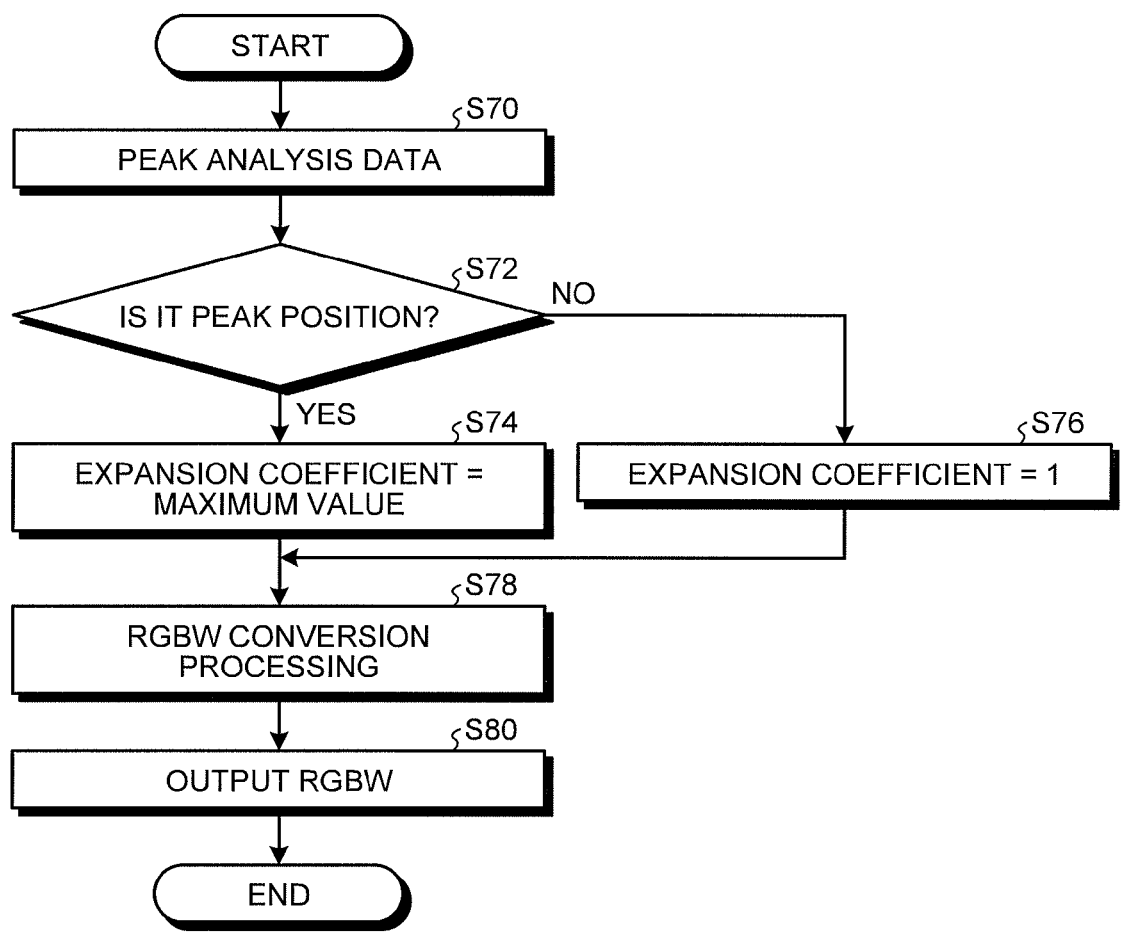
FIG. 12 is a flowchart of the method for driving the display device according to the embodiment.
Figure 13:
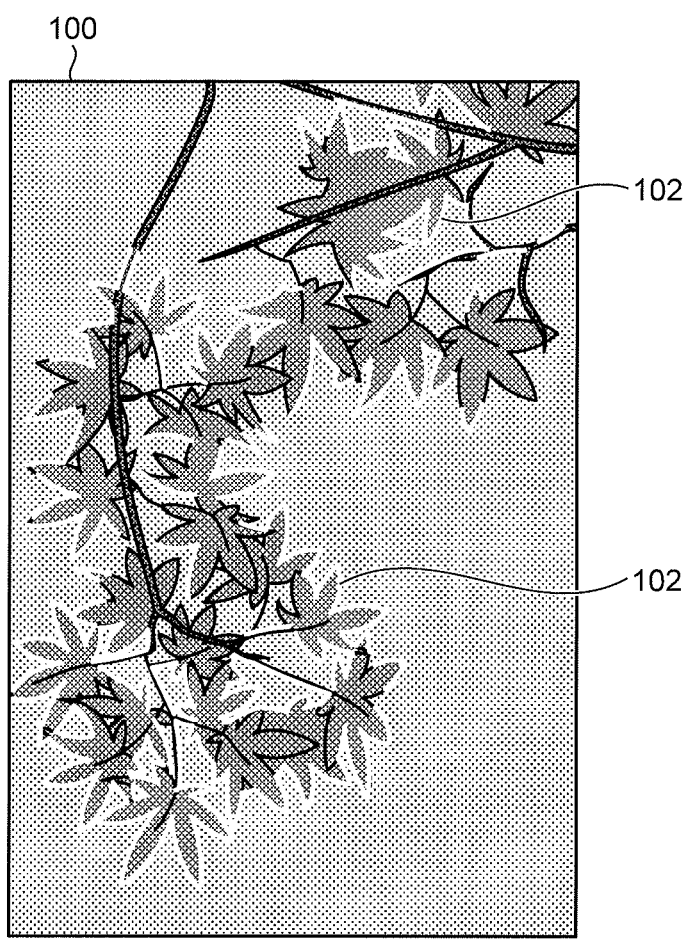
FIG. 13 is an explanatory diagram for explaining the method for driving the display device.

Next, the following describes an operation of controlling the image display panel 30 and an operation of controlling the surface light source device 50 performed by the signal processing unit 20, with reference to FIG. 7 to FIG. 13. FIG. 7 is a flowchart of a method for driving the display device according to the embodiment. FIG. 8 is a flowchart of the method for driving the display device according to the embodiment. FIG. 9 is an explanatory diagram for explaining the method for driving the display device. FIG. 10 is an explanatory diagram illustrating a relation between a peaking mode and signal conversion. FIG. 11 is a flowchart of the method for driving the display device according to the embodiment. FIG. 12 is a flowchart of the method for driving the display device according to the embodiment. FIG. 13 is an explanatory diagram for explaining the method for driving the display device.

FIG. 7 illustrates an example of the entire procedure of processing performed by the display device 10 to display the image. The following describes the procedure of the processing performed by the display device 10 with reference to FIG. 7. The signal processing unit 20 illustrated in FIG. 2 and FIG. 6 detects the input signal SRGB as illustrated in FIG. 7 (Step S22). The timing generation unit 21 then processes the input signal SRGB to send out a synchronizing signal STM for synchronizing timing between the image display panel driving unit 40 and the surface light source device driving unit 60 for each frame to the image display panel driving unit 40 and the surface light source device driving unit 60. The signal processing unit 20 analyzes the image generated from the input signal SRGB with the image processing unit 22 and the image analysis unit 24 (Step S24). The image processing unit 22 of the signal processing unit 20 according to the embodiment processes the input signal SRGB to generate an output signal (signal value $X_{1-(p,q)}$) of the first sub-pixel for determining display gradation of the first sub-pixel 49R, an output signal (signal value $X_{2-(p,q)}$) of the second sub-pixel for determining display gradation of the second sub-pixel 49G, an output signal (signal value $X_{3-(p,q)}$) of the third sub-pixel for determining display gradation of the third sub-pixel 49B, and an output signal (signal value $X_{4-(p,q)}$) of the fourth sub-pixel for determining display gradation of the fourth sub-pixel 49W. The signal processing unit 20 also analyzes the image based on the output signal generated in the image processing unit 22.

The following describes arithmetic processing of display data according to the embodiment in detail. Because the display device 10 includes the fourth sub-pixel 49W that outputs the fourth color (white) to the pixel 48, a dynamic range of brightness (also called as V (value) can be widened in an HSV color space (extended HSV color space) as illustrated in FIG. 4. That is, as illustrated in FIG. 4, a substantially trapezoidal three-dimensional space in which the maximum value of brightness V decreases as saturation S increases is placed on a cylindrical HSV color space that can be displayed with the first sub-pixel 49R, the second sub-pixel 49G, and the third sub-pixel 49B.

The image processing unit 22 of the signal processing unit 20 obtains the maximum value Vmax(S) of the brightness using the saturation S as a variable in the HSV color space extended by adding the fourth color (white). The signal processing unit 20 stores therein the maximum value Vmax(S) of the brightness using the saturation S in the extended HSV color space as a variable. That is, the signal processing unit 20 stores therein the maximum value Vmax(S) of the brightness for each pair of coordinates (values) of the saturation S and a hue H regarding the three-dimensional shape of the HSV color space illustrated in FIG. 4. Because the input signal includes the input signals of the first sub-pixel 49R, the second sub-pixel 49G, and the third sub-pixel 49B, the HSV color space of the input signal has a cylindrical shape, that is, the same shape as that of the cylindrical portion of the extended HSV color space.

Next, the image processing unit 22 of the signal processing unit 20 calculates the output signal (signal value $X_{1-(p,q)}$) of the first sub-pixel 49R based on at least the input signal (signal value $X_{1-(p,q)}$) and an expansion coefficient α of the first sub-pixel 49R, and outputs the output signal to the first sub-pixel 49R. The signal processing unit 20 calculates the output signal (signal value $X_{2-(p,q)}$) of the second sub-pixel 49G based on at least the input signal (signal value $x_{2-(p,q)}$) and the expansion coefficient α of the second sub-pixel 49G, and outputs the output signal to the second sub-pixel 49G. The signal processing unit 20 calculates the output signal (signal value $X_{3-(p,q)}$) of the third sub-pixel 49B based on at least the input signal (signal value $x_{3-(p,q)}$) and the expansion coefficient α of the third sub-pixel 49B, and outputs the output signal to the third sub-pixel 49B. The signal processing unit 20 further calculates the output signal (signal value $X_{4-(p,q)}$) of the fourth sub-pixel 49W based on the input signal (signal value $x_{1-(p,q)}$) of the first sub-pixel 49R, the input signal (signal value $x_{2-(p,q)}$) of the second sub-pixel 49G, and the input signal (signal value $x_{3-(p,q)}$) of the third sub-pixel 49B, and outputs the output signal to the fourth sub-pixel 49W.

Specifically, the image processing unit 22 of the signal processing unit 20 calculates the output signal of the first sub-pixel 49R based on the expansion coefficient α of the first sub-pixel 49R and the output signal of the fourth sub-pixel 49W. The image processing unit 22 of the signal processing unit 20 calculates the output signal of the second sub-pixel 49G based on the expansion coefficient α of the second sub-pixel 49G and the output signal of the fourth sub-pixel 49W. The image processing unit 22 of the signal processing unit 20 calculates the output signal of the third sub-pixel 49B based on the expansion coefficient α of the third sub-pixel 49B and the output signal of the fourth sub-pixel 49W.

Assuming that χ is a constant depending on the display device 10, the signal processing unit 20 obtains the following values through the expressions (1) to (3) described below: the signal value $X_{1-(p,q)}$ serving as the output signal of the first sub-pixel 49R, the signal value $X_{2-(p,q)}$ serving as the output signal of the second sub-pixel 49G, and the signal value $X_{3-(p,q)}$ serving as the output signal of the third sub-pixel 49B, with respect to the (p, q)-th pixel (or a set of the first sub-pixel 49R, the second sub-pixel 49G, and the third sub-pixel 49B).

$$X_{1-(p,q)} = \alpha \cdot x_{1-(p,q)} - \chi \cdot X_{4-(p,q)} \quad (1)$$

$$X_{2-(p,q)} = \alpha \cdot x_{2-(p,q)} - \chi \cdot X_{4-(p,q)} \quad (2)$$

$$X_{3-(p,q)} = \alpha \cdot x_{3-(p,q)} - \chi \cdot X_{4-(p,q)} \quad (3)$$

The signal processing unit 20 obtains the maximum value Vmax(S) of the brightness using the saturation S as a variable in the HSV color space extended by adding the fourth color, and obtains the saturation S and the brightness V(S) of the pixels 48 based on an input signal value of the sub-pixel 49 of the pixels 48.

The saturation S and the brightness V(S) are represented as follows: S=(Max−Min)/Max, and V(S)=Max. The saturation S can take a value from 0 to 1, and the brightness V(S) can take a value from 0 to ($2^n$−1). n represents a display gradation bit number. Max represents the maximum value among the input signal value of the first sub-pixel 49R, the input signal value of the second sub-pixel 49G, and the input signal value of the third sub-pixel 49B, with respect to the pixel 48. Min represents the minimum value among the input signal value of the first sub-pixel 49R, the input signal value of the second sub-pixel 49G, and the input signal value of the third sub-pixel 49B, with respect to the pixel 48. The hue H is represented in a range from 0° to 360° as illustrated in FIG. 5. From 0° to 360°, represented are red, yellow, green, cyan, blue, magenta, and red in this order.

In the embodiment, the signal value $X_{4-(p,q)}$ is obtained based on a product of the $Min_{(p,q)}$ and the expansion coefficient α. Specifically, the signal value $X_{4-(p,q)}$ can be obtained based on the following expression (4). In the expression (4), the product of the $Min_{(p,q)}$ and the expansion coefficient α is divided by χ. However, the embodiment is not limited thereto. χ will be described later.

$$X_{4-(p,q)} = Min_{(p,q)} \cdot \alpha / \chi \qquad (4)$$

Generally, in the (p, q)-th pixel, the saturation (saturation) $S_{(p,q)}$ and the brightness $V(S)_{(p,q)}$ in the cylindrical HSV color space are obtained through the following expressions (5) and (6) based on the input signal (signal value $x_{1-(p,q)}$) of the first sub-pixel 49R, the input signal (signal value $x_{2-(p,q)}$) of the second sub-pixel 49G, and the input signal (signal value $x_{3-(p,q)}$) of the third sub-pixel 49B.

$$S_{(p,q)} = (Max_{(p,q)} - Min_{(p,q)})/Max_{(p,q)} \qquad (5)$$

$$V(S)_{(p,q)} = Max_{(p,q)} \qquad (6)$$

Herein, $Max_{(p,q)}$ represents the maximum value among the input signal values of three sub-pixels 49 ($x_{1-(p,q)}$, $x_{2-(p,q)}$, $x_{1-(p,q)}$), and $Min_{(p,q)}$ represents the minimum value among the input signal values of three sub-pixels 49 ($x_{1-(p,q)}$, $x_{2-(p,q)}$, $x_{3-(p,q)}$). In the embodiment, n=8. That is, the display gradation bit number is set as 8 bits (a value of the display gradation is represented by 256 gradations from 0 to 255).

The color filter is not provided to the fourth sub-pixel 49W that displays white. The fourth sub-pixel 49W that displays the fourth color is brighter than the first sub-pixel 49R that displays the first color, the second sub-pixel 49G that displays the second color, and the third sub-pixel 49B that displays the third color, when being irradiated with the same light source lighting quantity. Luminance of an aggregate of the first sub-pixel 49R, the second sub-pixel 49G, and the third sub-pixel 49B included in the pixel 48 or a group of the pixels 48 is assumed to be $BN_{1-3}$ in a case in which a signal having a value corresponding to the maximum signal value of the output signal of the first sub-pixel 49R is input to the first sub-pixel 49R, a signal having a value corresponding to the maximum signal value of the output signal of the second sub-pixel 49G is input to the second sub-pixel 49G, and a signal having a value corresponding to the maximum signal value of the output signal of the third sub-pixel 49B is input to the third sub-pixel 49B. It is assumed that the luminance of the fourth sub-pixel 49W is represented by $BN_4$ when a signal having a value corresponding to the maximum signal value of the output signal of the fourth sub-pixel 49W is input to the fourth sub-pixel 49W included in the pixel 48 or a group of the pixels 48. That is, white with the maximum luminance is displayed by the aggregate of the first sub-pixel 49R, the second sub-pixel 49G, and the third sub-pixel 49B, and the luminance of white is represented by $BN_{1-3}$. Accordingly, assuming that χ is a constant depending on the display device 10, the constant χ is represented by $\chi = BN_4/BN_{1-3}$.

Specifically, the luminance $BN_4$ obtained when it is assumed that the input signal having a display gradation value 255 is input to the fourth sub-pixel 49W is, for example, 1.5 times the luminance $BN_{1-3}$ of white when the signal value $x_{1-(p,q)}=255$, the signal value $x_{2-(p,q)}=255$, and the signal value $x_{3-(p,q)}=255$ are input to the aggregate of the first sub-pixel 49R, the second sub-pixel 49G, and the third sub-pixel 49B as the input signals having such display gradation values. That is, x=1.5 in the embodiment.

When the signal value $X_{4-(p,q)}$ is obtained through the expression (4) described above, Vmax(S) can be represented by the following expressions (7) and (8).

When $S \leq S_0$, $$V\max(S) = (\chi+1) \cdot (2^n - 1) \qquad (7)$$

When $S_0 < S \leq 1$, $$V\max(S) = (2^n - 1) \cdot (1/S) \qquad (8)$$

Herein, $S_0 = 1/(\chi+1)$.

The thus obtained maximum value Vmax(S) of the brightness using the saturation S as a variable in the HSV color space extended by adding the fourth color is, for example, stored in the signal processing unit 20 as a kind of look-up table. Alternatively, the maximum value Vmax(S) of the brightness using the saturation S as a variable in the extended HSV color space is obtained by the signal processing unit 20 each time.

Next, the following describes a method for obtaining the signal values $X_{1-(p,q)}$, $X_{2-(p,q)}$, $X_{3-(p,q)}$, $X_{4-(p,q)}$, as the output signals for the (p, q)-th pixel 48 (expansion processing). The following processing is performed to maintain a ratio among the luminance of the first primary color displayed by (first sub-pixel 49R+fourth sub-pixel 49W), the luminance of the second primary color displayed by (second sub-pixel 49G+fourth sub-pixel 49W), and the luminance of the third primary color displayed by (third sub-pixel 49B+fourth sub-pixel 49W). In addition, the processing is performed to keep (maintain) a color tone, and also to keep (maintain) gradation-luminance characteristic (gamma characteristic, γ characteristic). When all of the input signal values are 0 or small in any pixel 48 or a group of the pixels 48, the expansion coefficient α may be obtained without including the pixel 48 or the group of the pixels 48.

First Process

First, the signal processing unit 20 obtains the saturation S and the brightness V(S) of the pixels 48 based on the input signal values of the sub-pixels 49 in the pixels 48. Specifically, $S_{(p,q)}$ and $V(S)_{(p,q)}$ are obtained through the expression (5) and the expression (6) based on the signal value $x_{1-(p,q)}$ serving as the input signal of the first sub-pixel 49R, the signal value $x_{2-(p,q)}$ serving as the input signal of the second sub-pixel 49G, and the signal value $x_{3-(p,q)}$ serving as the input signal of the third sub-pixel 49B, with respect to the (p, q)-th pixel 48. The signal processing unit 20 performs this processing on all of the pixels 48.

Second Process

Next, the signal processing unit 20 obtains an expansion coefficient α(S) based on Vmax(S)/V(S) obtained for the pixels 48.

$$\alpha(S) = V\max(S)/V(S) \qquad (9)$$

Third Process

Subsequently, the signal processing unit 20 obtains the signal value $X_{4-(p,q)}$ for the (p, q)-th pixel 48 based on at least the signal value $x_{1-(p,q)}$, the signal value $x_{2-(p,q)}$, and the signal value $x_{3-(p,q)}$. In the embodiment, the signal processing unit 20 determines the signal value $X_{4-(p,q)}$ based on $Min_{(p,q)}$, the expansion coefficient α, and the constant χ. More specifically, as described above, the signal processing unit 20 obtains the signal value $X_{4-(p,q)}$ based on the expression (4) described above. The signal processing unit 20 obtains the signal value $X_{4-(p,q)}$ for all of the $P_0 \times Q_0$ pixels 48.

Fourth Process

Thereafter, the signal processing unit 20 obtains the signal value $X_{1-(p,q)}$ for the (p, q)-th pixel 48 based on the signal value $x_{1-(p,q)}$, the expansion coefficient α, and the signal value $X_{4-(p,q)}$. The signal processing unit 20 obtains the signal value $X_{2-(p,q)}$ for the (p, q)-th pixel 48 based on the signal value $x_{2-(p,q)}$, the expansion coefficient α, and the signal value $X_{4-(p,q)}$. The signal processing unit 20 obtains the signal value $X_{3-(p,q)}$ for the (p, q)-th pixel 48 based on the signal value $x_{3-(p,q)}$, the expansion coefficient α, and the signal value $X_{4-(p,q)}$. Specifically, the signal processing unit 20 obtains the signal value $X_{1-(p,q)}$, the signal value $X_{2-(p,q)}$, and the signal value $X_{3-(p,q)}$ in the (p, q)-th pixel 48 based on the expressions (1) to (3) described above.

The signal processing unit 20 expands the value of $Min_{(p,q)}$ using the expansion coefficient α as represented by the expression (4). In this way, when the value of $Min_{(p,q)}$ is expanded with the expansion coefficient α, the luminance of a white display sub-pixel (fourth sub-pixel 49W) is increased, and the luminance of a red display sub-pixel, a green display sub-pixel, and a blue display sub-pixel (corresponding to the first sub-pixel 49R, the second sub-pixel 49G, and the third sub-pixel 49B, respectively) is also increased as represented by the expression described above. Accordingly, it is possible to avoid a problem that dullness in color occurs. That is, the luminance of the entire image is a times as compared with a case in which the value of $Min_{(p,q)}$ is not expanded because the value of $Min_{(p,q)}$ is expanded with the expansion coefficient α. Accordingly, a static image and the like can be preferably displayed with high luminance, for example.

The signal processing unit 20 performs processing on the image signal to be converted into the RGBW signal with the image processing unit 22, and analyzes the converted RGBW signal with the image analysis unit 24 to calculate 1/α. After performing the image analysis, the signal processing unit 20 performs processing for determining lighting quantity of the light source of the surface light source device 50 with the light source driving value determination unit 26 (Step S26). Specifically, the light source driving value determination unit 26 determines an output of the light source based on the image signal, and reduces the output based on 1/α. The signal value $X_{1-(p,q)}$, the signal value $X_{2-(p,q)}$, the signal value $X_{3-(p,q)}$, and the signal value $X_{4-(p,q)}$ for the (p, q)-th pixel 48 are expanded by a times. Accordingly, based on information of the input signal SRGB of the image, the display device 10 may reduce the luminance of the surface light source device 50 based on the expansion coefficient α so that the luminance of the image is the same as the luminance of the image that is not expanded. Specifically, the light source driving value determination unit 26 controls the electric current or the duty ratio of on/off with respect to the light source so that the luminance of the surface light source device 50 is increased by (1/α) times.

After determining the lighting quantity of the light source, the signal processing unit 20 calculates a luminance distribution output from the surface light source device 50 based on the lighting quantity of the light source, corrects the output signal based on a result thereof, generates a display signal (Step S28), and outputs the generated display signal to the image display panel driving unit 40 (Step S30). As described above, the signal processing unit 20 determines the signal to be displayed on the image display panel 30 and the amount of light output from the surface light source device 50, so that the display quality can be prevented from being deteriorated and the image can be displayed with reduced power consumption through simple processing.

Next, the following describes the peaking processing performed by the signal processing unit 20 with reference to FIG. 8 to FIG. 13. When acquiring data of an imaged image as the image to be displayed, the signal processing unit 20 performs processing illustrated in FIG. 8. The signal processing unit 20 performs the processing illustrated in FIG. 8 in parallel with the steps in FIG. 7.

When acquiring the imaged image data (Step S40), the signal processing unit 20 acquires selection information of the peaking mode (Step S42). The signal processing unit 20 acquires the selection information of the peaking mode input by the user while displaying a screen 80 illustrated in FIG. 9. The selection information of the peaking mode may be input in advance, or may be obtained by displaying the screen for selection at Step S40.

In the embodiment, herein, an item 82 of "no peaking display" for selecting not to perform peaking display on the screen 80, and an item 84a to item 84h for performing the peaking display and indicating a display method for the peaking display. The item 84a is a mode for highlighting the focusing region in white, and represented as "white". The item 84b is a mode for highlighting the focusing region in red, and represented as "red". The item 84c is a mode for highlighting the focusing region in yellow, and represented as "yellow". The item 84d is a mode for displaying the focusing region more brightly than other regions to highlight the focusing region, and represented as "light". The item 84e is a mode for highlighting the focusing region in light white, and represented as "light white". The item 84f is a mode for highlighting the focusing region in light red, and represented as "light red". The item 84g is a mode for highlighting the focusing region in light yellow, and represented as "light yellow". The item 84h is a mode for displaying the focusing region more brightly than the "light" mode to highlight the focusing region, and represented as "light (intensified)". These are exemplary only, and a color name and the like are not limited thereto.

When acquiring peaking mode selection information, the signal processing unit 20 determines whether the peaking mode is selected, that is, the peaking processing is selected to be performed (Step S44).

If it is determined that the peaking mode is not selected (No at Step S44), that is, it is determined that the item 82 in the screen 80 is selected, the signal processing unit 20 displays the image in a normal mode (Step S46). Specifically, the processing is performed without distinguishing the focusing region from other regions to display the image. The signal processing unit 20 can also display the image without using the fourth sub-pixel 49W.

If it is determined that the peaking mode is selected (Yes at Step S44), that is, it is determined that any of the item 84a to the item 84h in the screen 80 is selected, the signal processing unit 20 determines the peaking mode based on the item selected from the items 84a to 84h (Step S48). That is, the signal processing unit 20 determines the processing to be performed on the focusing region.

After determining the peaking mode, the signal processing unit 20 specifies a peak position (Step S50), that is, specifies the focusing region that is in focus in the imaged image. After specifying the peak position of the imaged image with the image analysis unit 24, the signal processing unit 20 processes the image based on the peak position (Step S52). The processing performed on the peak position will be described later.

After processing the image, the signal processing unit 20 displays the image (Step S54). The signal processing unit 20 may perform the processing of FIG. 7 on regions other than the peak position (focusing region), or may display the regions without using the fourth sub-pixel 49W.

Next, the following describes the peaking processing with reference to FIG. 10 to FIG. 13. In each peaking mode, each of the signal values of the sub-pixels is processed using a relation illustrated in FIG. 10, the sub-pixels being the first sub-pixel 49R, the second sub-pixel 49G, the third sub-pixel 49B, and the fourth sub-pixel 49W included in the pixel in the focusing region. Each of RGBW illustrated in FIG. 10 is a value in a case in which each signal value of the sub-pixels is represented by 256 gradations from 0 to 255. The value is 0 when the luminance of the sub-pixel is the lowest, and the value is 255 when the luminance thereof is the highest.

When the "white" mode is selected, the signal processing unit 20 sets a signal value R of the first sub-pixel 49R to 255, sets a signal value G of the second sub-pixel 49G to 255, sets a signal value B of the third sub-pixel 49B to 255, and sets a signal value W of the fourth sub-pixel 49W to 0. When the "red" mode is selected, the signal processing unit 20 sets the signal value R of the first sub-pixel 49R to 255, sets the signal value G of the second sub-pixel 49G to 0, sets the signal value B of the third sub-pixel 49B to 0, and sets the signal value W of the fourth sub-pixel 49W to 0. When the "yellow" mode is selected, the signal processing unit 20 sets the signal value R of the first sub-pixel 49R to 255, sets the signal value G of the second sub-pixel 49G to 255, sets the signal value B of the third sub-pixel 49B to 0, and sets the signal value W of the fourth sub-pixel 49W to 0.

When the "light" mode is selected, the signal processing unit 20 sets the expansion coefficient of the signal value R of the first sub-pixel 49R as $\alpha=1+X$, sets the expansion coefficient of the signal value G of the second sub-pixel 49G as $\alpha=1+X$, sets the expansion coefficient of the signal value B of the third sub-pixel 49B as $\alpha=1+X$, and sets the expansion coefficient of the signal value W of the fourth sub-pixel 49W as $\alpha=1+X$. In this case, the signal processing unit 20 sets the expansion coefficient of each pixel in regions other than the focusing region to a value lower than the expansion coefficient of the focusing region, such as $\alpha=1$. Herein, X may be an arbitrary value, for example, a value of 0 to $\chi$. When the "light" mode is selected, the signal processing unit 20 causes the expansion coefficients to be different from each other between the pixels in the focusing region and other pixels, and causes the focusing region to be brighter than the other regions.

When the "light white" mode is selected, the signal processing unit 20 sets the signal value R of the first sub-pixel 49R to 255, sets the signal value G of the second sub-pixel 49G to 255, sets the signal value B of the third sub-pixel 49B to 255, and sets the signal value W of the fourth sub-pixel 49W to 255. When the "light red" mode is selected, the signal processing unit 20 sets the signal value R of the first sub-pixel 49R to 255, sets the signal value G of the second sub-pixel 49G to 0, sets the signal value B of the third sub-pixel 49B to 0, and sets the signal value of the fourth sub-pixel 49W to 255. When the "light yellow" mode is selected, the signal processing unit 20 sets the signal value R of the first sub-pixel 49R to 255, sets the signal value G of the second sub-pixel 49G to 255, sets the signal value B of the third sub-pixel 49B to 0, and sets the signal value W of the fourth sub-pixel 49W to 255.

When the "light (intensified)" mode is selected, the signal processing unit 20 sets the expansion coefficient of the signal value R of the first sub-pixel 49R as $\alpha=1$, sets the expansion coefficient of the signal value G of the second sub-pixel 49G as $\alpha=1$, sets the expansion coefficient of the signal value B of the third sub-pixel 49B as $\alpha=1$, and sets the signal value W of the fourth sub-pixel 49W to 255.

Next, the following describes image processing based on the peak position, specifically, an example of the processing at Step S52, with reference to FIG. 11. The processing in FIG. 11 is performed when the light white mode is selected. The signal processing unit 20 performs the processing in FIG. 11 on each pixel. The signal processing unit 20 acquires peak analysis data including information about the peak position (Step S60), and determines whether a pixel of interest is included in the peak position, that is, the focusing region (Step S62).

If it is determined that the pixel is included in the peak position (Yes at Step S62), the signal processing unit 20 converts all of the signal values of RGBW into 255 to be output (Step S64). If it is determined that the pixel is not included in the peak position (No at Step S62), the signal processing unit 20 outputs the calculated signal values of RGBW as they are (Step S66). By repeating the processing in FIG. 11 on all the pixels in the screen, the signal processing unit 20 can cause the signal values of four sub-pixels of the pixel included in the peak position, that is, the focusing region to be 255.

Although FIG. 11 illustrates the case of light white, the same processing can also be performed in the cases of white, red, yellow, light red, and light yellow. In the table of FIG. 10, although the signal value is set to 255 serving as the maximum value, the signal value may be 250 and the like so long as the luminance can be distinguished from those of other pixels.

Next, the following describes the image processing based on the peak position, specifically, an example of the processing at Step S52, with reference to FIG. 12. The processing in FIG. 12 is performed when the light mode is selected. The signal processing unit 20 performs the processing in FIG. 12 on each pixel. The signal processing unit 20 acquires peak analysis data including information about the peak position (Step S70), and determines whether a pixel of interest is included in the peak position, that is, the focusing region (Step S72).

If it is determined that the pixel is included in the peak position (Yes at Step S72), the signal processing unit 20 sets the expansion coefficient to the maximum, that is, $\alpha=1+X$ (Step S74). If it is determined that the pixel is not included in the peak position (No at Step S72), the signal processing unit 20 sets the expansion coefficient to 1, that is, $\alpha=1$ (Step S76). After determining the expansion coefficient of the pixel, the signal processing unit 20 performs RGBW conversion processing using the determined expansion coefficient (Step S78), outputs a conversion result as an RGBW output signal, and outputs the image (Step S80). By performing the processing in FIG. 12, the signal processing unit 20 can cause pixels included in the focusing region to be displayed more brightly than pixels included in the other regions.

By processing each pixel in the peak position as described above, the display device 10 can display a peak position 102 in a state of being more conspicuous than other portions like an image 100 illustrated in FIG. 13. Specifically, the display device 10 can display each pixel in the focusing region brightly with color balance that is not output in normal display by causing the signal value (luminance) of the fourth sub-pixel in the focusing region to be higher than the signal value (luminance) of the fourth sub-pixel in other regions in accordance with the setting, such as light, light white, light red, light yellow, and light (intensified).

The display device 10 can display each pixel in the focusing region brightly with color balance that is not output in normal display by causing the signal value (luminance) of the fourth sub-pixel to be high in accordance with the setting, such as light white, light red, light yellow, and light (intensified). Accordingly, color of the focusing region can be easily distinguished from color of the other regions, and bright and conspicuous display can be obtained. Specifically, because the pixels can be displayed in colors different from colors that may be displayed with the image signal such as white, red, and yellow, the user can be prevented from recognizing a region that is not the focusing region as the focusing region.

The display device 10 can also make the focusing region be easily viewable by selecting the light mode and causing the expansion coefficient of the focusing region to be brighter than the expansion coefficient of the other regions to cause the focusing region to be displayed more brightly than the other regions as illustrated in FIG. 12. By setting the expansion coefficient to a high value and making the focusing region be conspicuous, the focusing region can be recognized while maintaining a state in which an original color tone of the focusing region can be grasped.

As described above, when the focusing region is made easily viewable by displaying the focusing region more brightly than the other regions, visibility can be improved in using the display device 10 outside a room.

The display device 10 can also display the focusing region according to user's preference by enabling the modes of white, red, and yellow that can be made with three-color display to be selected in addition to the modes of light, light white, light red, light yellow, and light (intensified).

Although the electronic apparatus according to the embodiment preferably includes the imaging device, it may be sufficient that the electronic apparatus includes the display device. The electronic apparatus can perform the processing described above as processing for displaying the image imaged by the imaging device on the display device. When the electronic apparatus includes the imaging device and causes the image imaged by the display device to be displayed after being processed in the peaking mode in imaging by the imaging device, the electronic apparatus can perform photographing while grasping an in-focus portion of the image.

The embodiment described above can provide the display device that displays the focusing region to be easily viewable regardless of the imaged image, and the method for driving the display device.

The display device according to the embodiment has been exemplified as a disclosure. As additional application examples, examples of the display device include, but are not limited to, all sorts of flat-panel type display devices such as a liquid crystal display device, an organic electroluminescent (EL) display device, another self-luminous display device, an electronic paper display device including an electrophoresis element and the like. Obviously, the size of the display device is not particularly limited. Sizes from the smallest to the largest can be applied.

APPLICATION EXAMPLE

The following describes application examples of the display device 10 described in the embodiment with reference to FIG. 14 to FIG. 19. FIG. 14 to FIG. 19 are diagrams illustrating an example of the electronic apparatus to which the display device according to the embodiment is applied. The display device 10 according to the embodiment can be applied to electronic apparatuses in various fields such as a portable terminal device including a cellular telephone, a smartphone, and the like, a digital camera, a video camera, a television apparatus, a notebook-type personal computer, and meters mounted on a vehicle. In other words, the display device 10 according to the embodiment can be applied to electronic apparatuses in various fields for displaying a video signal input from the outside or a video signal generated inside as an image or video. The electronic apparatus includes a controller that supplies the video signal to the display device 10 to control an operation of the display device 10.

Application Example 1

Figure 14:
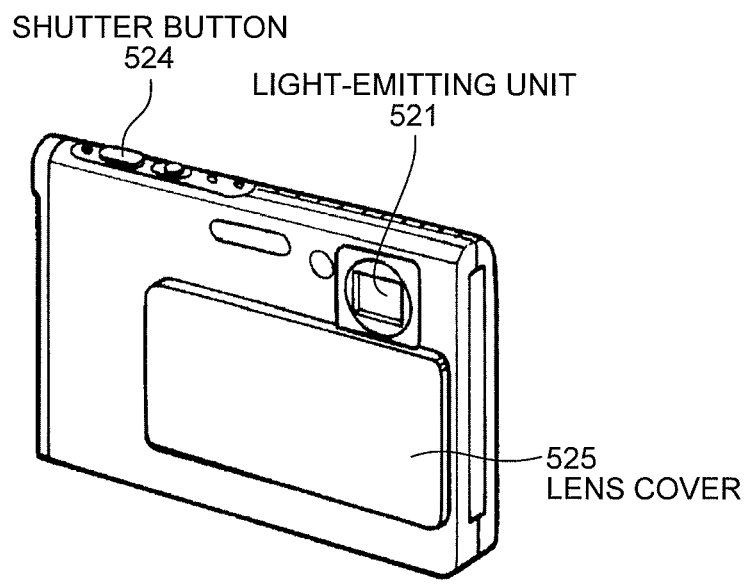
FIG. 14 is a diagram illustrating an example of an electronic apparatus to which the display device according to the embodiment is applied.
Figure 15:
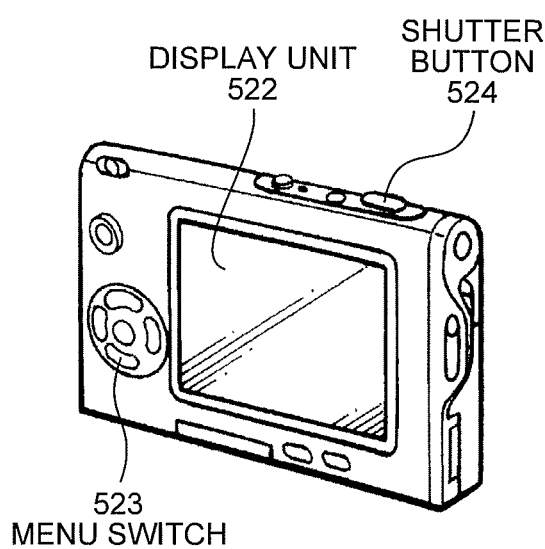
FIG. 15 is a diagram illustrating an example of an electronic apparatus to which the display device according to the embodiment is applied.

An electronic apparatus illustrated in FIG. 14 and FIG. 15 is a digital camera to which the display device 10 according to the embodiment is applied. The digital camera includes, for example, a flash light-emitting unit 521, a display unit 522, a menu switch 523, and a shutter button 524. The display unit 522 is the display device 10 according to the embodiment. As illustrated in FIG. 14, the digital camera includes a lens cover 525. A photographing lens appears when the lens cover 525 is slid. A digital photograph can be taken with the digital camera by imaging light incident from the photographing lens thereof. The lens cover 525 is part of the imaging device 8 according to the embodiment.

Application Example 2

Figure 16:
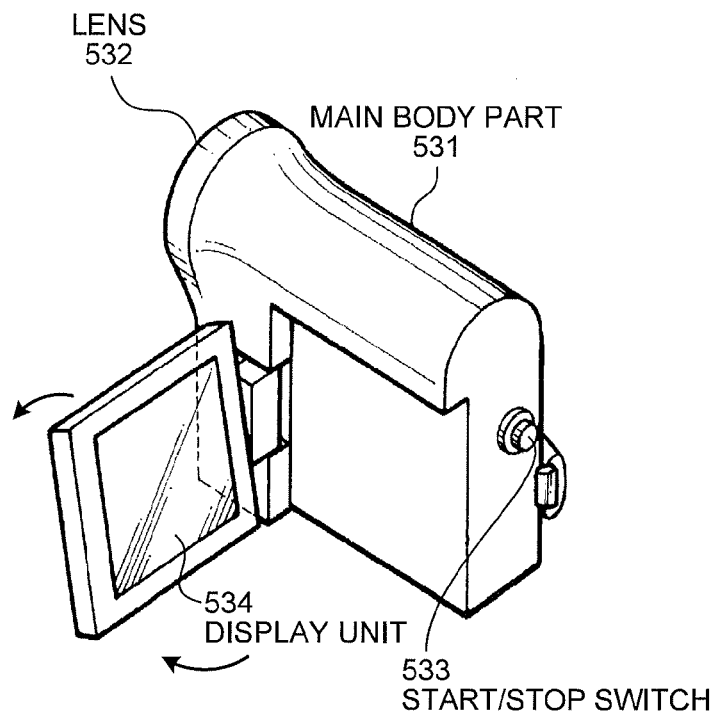
FIG. 16 is a diagram illustrating an example of an electronic apparatus to which the display device according to the embodiment is applied.

The electronic apparatus illustrated in FIG. 16 represents an external appearance of a video camera to which the display device 10 according to the embodiment is applied. The video camera includes, for example, a main body part 531, a lens 532 for photographing a subject provided on a front side of the main body part 531, a start/stop switch 533 for photographing, and a display unit 534. The display unit 534 is the display device 10 according to the embodiment. The lens 532 is part of the imaging device 8 according to the embodiment.

Application Example 3

Figure 17:
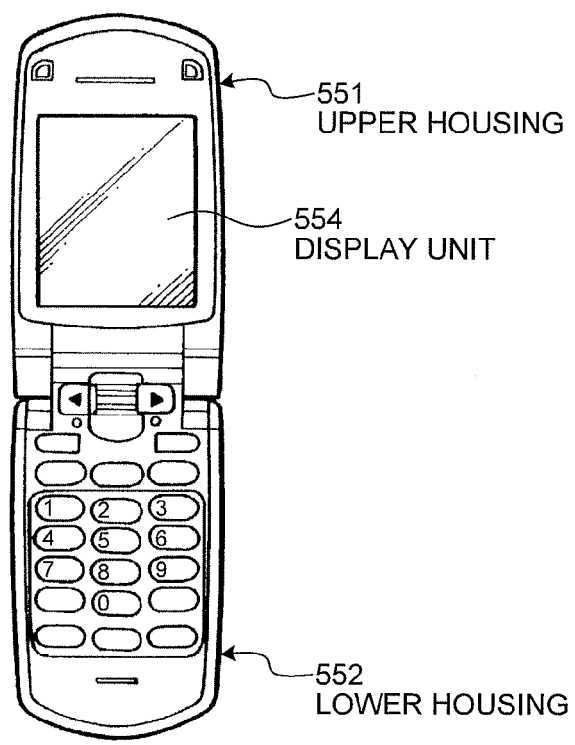
FIG. 17 is a diagram illustrating an example of an electronic apparatus to which the display device according to the embodiment is applied.
Figure 18:
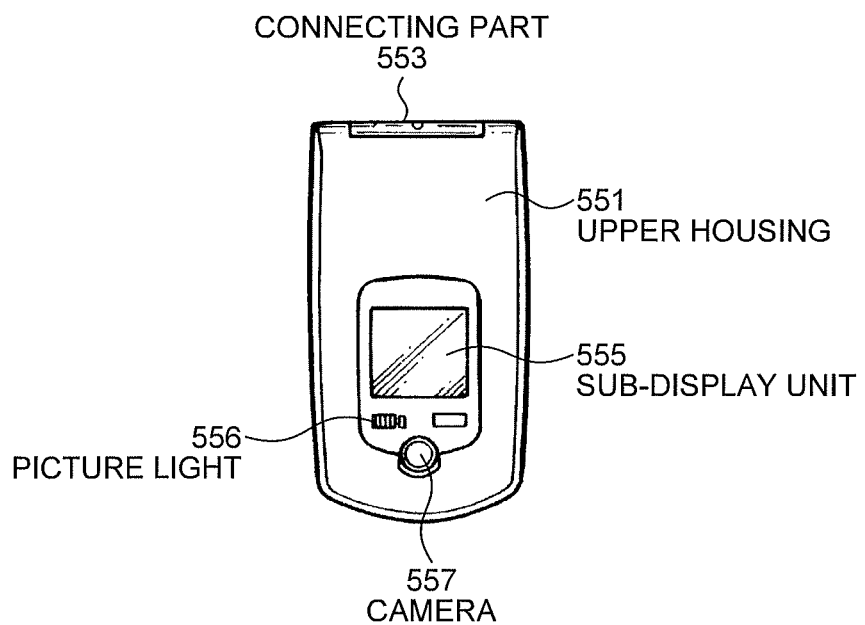
FIG. 18 is a diagram illustrating an example of an electronic apparatus to which the display device according to the embodiment is applied.

An electronic apparatus illustrated in FIG. 17 and FIG. 18 is a mobile phone to which the display device 10 is applied. FIG. 17 is a front view of the mobile phone in an opened state. FIG. 18 is a front view of the mobile phone in a folded state. The mobile phone is made, for example, by connecting an upper housing 551 and a lower housing 552 with a connecting part (hinge part) 553, and includes a display unit 554, a sub-display unit 555, a picture light 556, and a camera 557. The display device 10 is mounted as the display unit 554. The display unit 554 of the mobile phone may have a function for detecting a touch operation in addition to a function for displaying an image. The camera 557 is the imaging device 8 according to the embodiment.

Application Example 4

Figure 19:
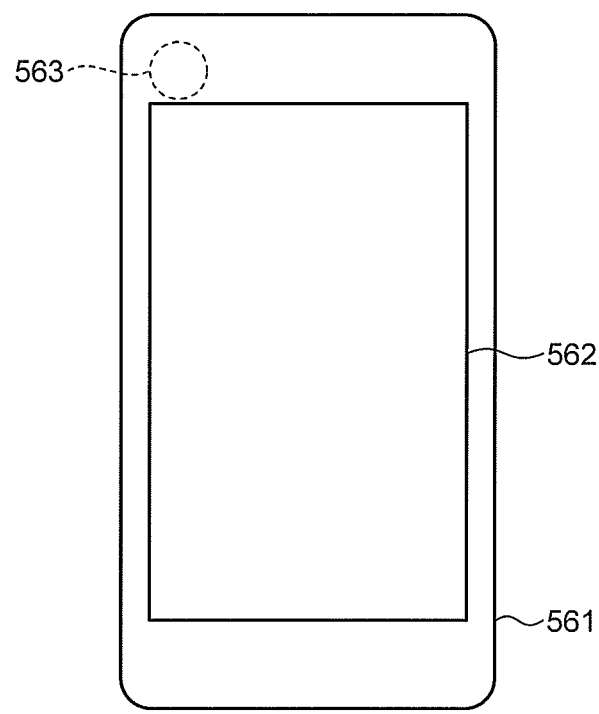
FIG. 19 is a diagram illustrating an example of an electronic apparatus to which the display device according to the embodiment is applied.

An electronic apparatus illustrated in FIG. 19 is a portable information terminal that operates as a portable computer, a multifunctional mobile phone, a mobile computer allowing a voice communication, or a mobile computer allowing a communication, and is called a smartphone or a tablet terminal in some cases. The portable information terminal includes, for example, a display unit 562 and a camera 563 on a surface of a housing 561. The display unit 562 is the display device 10 according to the embodiment. The camera 563 is the imaging device 8 according to the embodiment.

Accordingly, the electronic apparatus can be provided that displays the focusing region to be easily viewable regardless of the imaged image.

Aspects of Present Disclosure

The present disclosure includes the following aspects:

(1) A display device that displays an imaged image, the display device comprising:

an image display panel in which pixels are arranged in a two-dimensional matrix, each of the pixels including a first sub-pixel that displays a first color, a second sub-pixel that displays a second color, a third sub-pixel that displays a third color, and a fourth sub-pixel that displays a fourth color; and a signal processing unit that converts an input value of an input HSV color space of an input signal into an extension value of an extended HSV color space extended with the first color, the second color, the third color, and the fourth color to generate an output signal, and outputs the output signal to the image display panel, wherein the signal processing unit comprises:
an image processing unit that converts the input value of the input HSV color space of the input signal into the extension value of the extended HSV color space extended with the first color, the second color, the third color, and the fourth color, to generate the output signal;
an image processing unit that performs peaking processing for analyzing the input signal of the imaged image to detect a focusing region in which a subject exists at a focal position; and
a mode determination unit that determines whether to perform display in a peaking mode for highlighting the focusing region, and when the mode determination unit determines to perform display in the peaking mode, the signal processing unit increases a value of the output signal of the fourth color of a pixel in an outer edge of the focusing region.

(2) The display device according to (1), wherein when the mode determination unit determines to perform display in the peaking mode, the signal processing unit sets each value of the output signals of the first color, the second color, the third color, and the fourth color of the pixel in the outer edge of the focusing region to be a maximum value.

(3) The display device according to (1), wherein when the mode determination unit determines to perform display in the peaking mode, the signal processing unit sets the value of the output signal of the fourth color of the pixel in the outer edge of the focusing region to be a maximum value.

(4) The display device according to (1), wherein when the mode determination unit determines to perform display in the peaking mode, the signal processing unit converts the input value of a pixel in a region other than the focusing region into the extension value of the extended HSV color space extended with the first color, the second color, and the third color, and converts the input value of the pixel in the outer edge of the focusing region into the extension value of the extended HSV color space extended with the first color, the second color, the third color, and the fourth color, to generate the output signal.

(5) The display device according to (1), wherein the signal processing unit performs processing for enhancing luminance by multiplying the output signal by an expansion coefficient in processing for converting the input value of the input HSV color space of the input signal into the extension value of the extended HSV color space extended with the first color, the second color, the third color, and the fourth color, to generate the output signal, and when the mode determination unit determines to perform display in the peaking mode, the expansion coefficient with respect to the output signal of the pixel in the outer edge of the focusing region is caused to be larger than the expansion coefficient with respect to the output signal of the pixel in the region other than the focusing region.

(6) The display device according to (1), wherein the fourth color is white.

(7) An electronic apparatus comprising:
the display device according to (1); and
an imaging device that images the imaged image.

(8) A method for driving a display device that displays an imaged image, the display device comprising an image display panel in which pixels are arranged in a two-dimensional matrix, each of the pixels including a first sub-pixel that displays a first color, a second sub-pixel that displays a second color, a third sub-pixel that displays a third color, and a fourth sub-pixel that displays a fourth color, the method comprising:

detecting an input value of an input HSV color space of an input signal;

determining whether to perform display in a peaking mode for highlighting a focusing region, in which a subject exists at a focal position, in the imaged image;

performing peaking processing for analyzing the input signal of the imaged image to detect the focusing region when it is determined to perform display in the peaking mode; and converting the input value into an extension value of an extended HSV color space extended with the first color, the second color, the third color, and the fourth color to generate an output signal, increasing a value of the output signal of the fourth color of a pixel in an outer edge of the focusing region, and outputting the output signal to the image display panel.

What is claimed is:

1. A display device that displays an imaged image, the display device comprising:

an image display panel in which pixels are arranged in a two-dimensional matrix, each of the pixels including a first sub-pixel that displays a first color, a second sub-pixel that displays a second color, a third sub-pixel that displays a third color, and a fourth sub-pixel that displays a fourth color; and a signal processing unit that converts an input value of an input HSV color space of an input signal into an extension value of an extended HSV color space extended with the first color, the second color, the third color, and the fourth color to generate an output signal, and outputs the output signal to the image display panel, wherein the signal processing unit comprises:
an image processing unit that converts the input value of the input HSV color space of the input signal into the extension value of the extended HSV color space extended with the first color, the second color, the third color, and the fourth color, to generate the output signal;
an image processing unit that performs peaking processing for analyzing the input signal of the imaged image to detect a focusing region in which a subject exists at a focal position; and a mode determination unit that determines whether to perform display in a peaking mode for highlighting the focusing region, and when the mode determination unit determines to perform display in the peaking mode, the signal processing unit increases a value of the output signal of the fourth color of a pixel in an outer edge of the focusing region.

2. The display device according to claim 1, wherein when the mode determination unit determines to perform display in the peaking mode, the signal processing unit sets each value of the output signals of the first color, the second color, the third color, and the fourth color of the pixel in the outer edge of the focusing region to be a maximum value.

3. The display device according to claim 1, wherein when the mode determination unit determines to perform display in the peaking mode, the signal processing unit sets the value of the output signal of the fourth color of the pixel in the outer edge of the focusing region to be a maximum value.

4. The display device according to claim 1, wherein when the mode determination unit determines to perform display in the peaking mode, the signal processing unit converts the input value of a pixel in a region other than the focusing region into the extension value of the extended HSV color space extended with the first color, the second color, and the third color, and converts the input value of the pixel in the outer edge of the focusing region into the extension value of the extended HSV color space extended with the first color, the second color, the third color, and the fourth color, to generate the output signal.

5. The display device according to claim 1, wherein the signal processing unit performs processing for enhancing luminance by multiplying the output signal by an expansion coefficient in processing for converting the input value of the input HSV color space of the input signal into the extension value of the extended HSV color space extended with the first color, the second color, the third color, and the fourth color, to generate the output signal, and when the mode determination unit determines to perform display in the peaking mode, the expansion coefficient with respect to the output signal of the pixel in the outer edge of the focusing region is caused to be larger than the expansion coefficient with respect to the output signal of the pixel in the region other than the focusing region.

6. The display device according to claim 1, wherein the fourth color is white.

7. A method for driving a display device that displays an imaged image, the display device comprising an image display panel in which pixels are arranged in a two-dimensional matrix, each of the pixels including a first sub-pixel that displays a first color, a second sub-pixel that displays a second color, a third sub-pixel that displays a third color, and a fourth sub-pixel that displays a fourth color, the method comprising:

detecting an input value of an input HSV color space of an input signal;

determining whether to perform display in a peaking mode for highlighting a focusing region, in which a subject exists at a focal position, in the imaged image;

performing peaking processing for analyzing the input signal of the imaged image to detect the focusing region when it is determined to perform display in the peaking mode; and converting the input value into an extension value of an extended HSV color space extended with the first color, the second color, the third color, and the fourth color to generate an output signal, increasing a value of the output signal of the fourth color of a pixel in an outer edge of the focusing region, and outputting the output signal to the image display panel.

* * * * *